United States Patent
Negro et al.

(10) Patent No.: US 9,104,935 B1
(45) Date of Patent: Aug. 11, 2015

(54) MARK READER CONFIGURED TO PRIORITIZE IMAGES

(71) Applicants: James A. Negro, Arlington, MA (US); John Keating, Medway, MA (US)

(72) Inventors: James A. Negro, Arlington, MA (US); John Keating, Medway, MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 14/145,024

(22) Filed: Dec. 31, 2013

Related U.S. Application Data (63) Continuation-in-part of application No. 14/013,074, filed on Aug. 29, 2013, which is a continuation of application No. 12/982,007, filed on Dec. 30, 2010, now Pat. No. 8,542,930.

(51) Int. Cl.
*G06K 7/00* (2006.01)
*G06K 7/10* (2006.01)
*G06K 7/14* (2006.01)

(52) U.S. Cl.
CPC .................................. *G06K 7/1465* (2013.01)

(58) Field of Classification Search
USPC ........ 382/190, 232, 312; 235/462.25, 462.16, 235/470, 435, 462.01, 437
See application file for complete search history.

(56) References Cited

U.S. PATENT DOCUMENTS

| | | | |
|---|---|---|---|
| 4,751,375 A | 6/1988 | Ravizza | |
| 4,988,852 A | 1/1991 | Krishnan | |
| 5,512,739 A | 4/1996 | Chandler et al. | |
| 5,592,228 A | 1/1997 | Dachiku et al. | |
| 5,698,833 A | 12/1997 | Skinger | |
| 5,770,841 A | 6/1998 | Moed et al. | |
| 5,770,848 A | 6/1998 | Oizumi et al. | |
| 6,494,375 B1 | 12/2002 | Ishibashi et al. | |
| 6,778,683 B1 | 8/2004 | Bonner et al. | |
| 6,880,758 B2 | 4/2005 | Park et al. | |
| 7,104,453 B1 | 9/2006 | Zhu et al. | |
| 7,121,469 B2 | 10/2006 | Dorai et al. | |
| 7,181,066 B1 | 2/2007 | Wagman et al. | |
| 7,199,385 B2 | 4/2007 | Wehrle et al. | |
| 7,254,665 B2 | 8/2007 | Yee | |
| 7,331,523 B2 * | 2/2008 | Meier et al. | 235/462.25 |
| 7,392,951 B2 | 7/2008 | Ray et al. | |
| 7,466,868 B2 | 12/2008 | Wilensky | |
| 7,545,949 B2 | 6/2009 | Mirtich et al. | |
| 7,646,887 B2 | 1/2010 | Goncalves et al. | |
| 7,721,964 B2 | 5/2010 | Reichenbach et al. | |
| 7,852,519 B2 | 12/2010 | Meier et al. | |
| 8,542,930 B1 | 9/2013 | Negro et al. | |
| 2001/0006191 A1 | 7/2001 | Hecht et al. | |
| 2002/0057852 A1 | 5/2002 | Durbin et al. | |
| 2006/0076415 A1 | 4/2006 | Reichenbach et al. | |
| 2006/0091219 A1 | 5/2006 | Joseph et al. | |
| 2006/0261167 A1 | 11/2006 | Ray et al. | |
| 2007/0014542 A1 | 1/2007 | Poulsen | |
| 2008/0029599 A1 | 2/2008 | Tskos et al. | |
| 2009/0095047 A1 | 4/2009 | Patel | |
| 2010/0200660 A1 | 8/2010 | Moed et al. | |
| 2011/0075156 A1 | 3/2011 | Patel et al. | |

* cited by examiner

*Primary Examiner* — Daniel St Cyr
(74) *Attorney, Agent, or Firm* — Quarles & Brady LLP (57) ABSTRACT

Systems and methods for use with a mark reader that reduce the trigger-to-decode response time by prioritizing images to be decoded based on the likelihood of a successful decode are provided. A reader attempts to decode a priority image(s) first to avoid attempting to decode images that are less likely than other images to be successfully decoded. Images are rated based on feature attributes, and then prioritized for decoding. Image feature attributes are correlated with parameter groups, and the parameter groups are prioritized for use in subsequent image acquisitions.

24 Claims, 9 Drawing Sheets

MARK READER CONFIGURED TO PRIORITIZE IMAGES

CROSS-REFERENCE TO RELATED APPLICATIONS

This application is a continuation-in-part of pending U.S. patent application Ser. No. 14/013,074, filed Aug. 29, 2013, and entitled "Mark Reader Configured to Prioritize Images," which is a continuation of U.S. patent application Ser. No. 12/982,007, filed Dec. 30, 2010, now U.S. Pat. No. 8,542,930, dated Sep. 24, 2013, and entitled "Mark Reader Configured to Prioritize Images," all of which are hereby incorporated by reference.

STATEMENT REGARDING FEDERALLY SPONSORED RESEARCH OR DEVELOPMENT

Not applicable.

BACKGROUND OF THE TECHNOLOGY

The present technology relates to the field of mark or symbology readers used to read marks (e.g., symbols, barcodes, text characters including alphanumeric, kanji, etc.) directly on objects, and more specifically to a reader that is configured to prioritize images for decoding to reduce the time for a successful decode.

Mark or symbology reading (also commonly termed barcode scanning) entails the aiming of an image acquisition sensor (e.g., CMOS camera, CCD, etc.) or vision system (e.g., VSOC) contained within the reader at a location on an object that contains a mark, and acquiring an image of the mark. Marks are known and available in a variety of shapes and sizes, and are designed to contain data, such as a set of predetermined patterns that represent an ordered group of characters or shapes. The reader, including an attached data processor (e.g., a microcomputer), can derive useful information from the data about the scanned object (e.g., its serial number, type, model, price, etc.).

Figure 1:
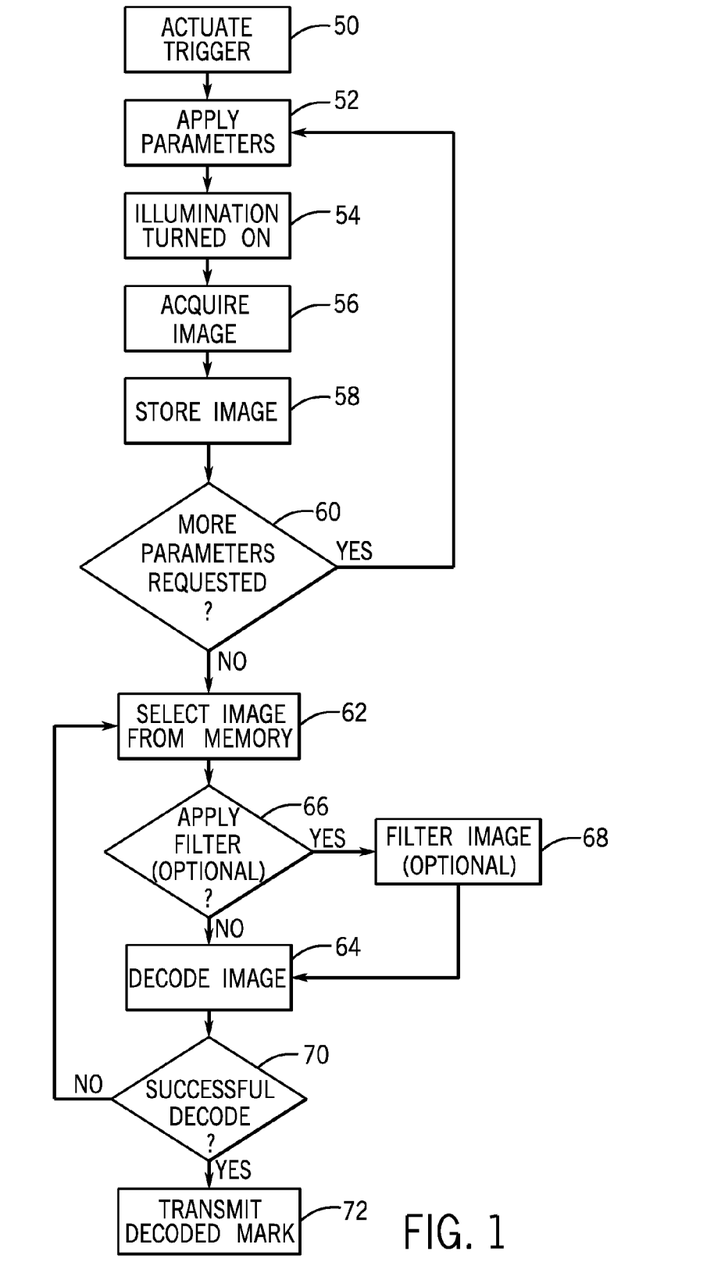
FIG. 1 is a flowchart illustrating a method wherein a reader cycles through a known image decoding process.

Referring to FIG. 1, the image decoding process in known mark readers typically works in the following way. The image decoding process is initiated, such as by a trigger signal, as indicated at process block 50. At this point, the reader may or may not be pointing at the mark to be decoded. The reader then applies the first in possibly a selection of one or more parameter groups to an image acquisition system, as indicated at process block 52. Parameter groups include an arrangement of one or more parameter settings including exposure, gain, focus selection, illumination selection, and illumination control, for example. After the parameters for an image acquisition are applied, an illumination source on or within the reader is turned ON at process block 54 to illuminate the mark to be decoded. Illumination, either external or ambient illumination and/or illumination from the reader, reflects off of the intended mark and back to the reader and onto, i.e., to expose, an image acquisition sensor within the reader to acquire an image of the mark, as indicated at process block 56. Typically, the sensed image is transferred to memory (e.g., SDRAM), for storage, as indicated at process block 58.

If the reader is configured to acquire one or more additional images, as indicated at decision block 60, a new parameter group is applied to the acquisition system and the process repeats starting at process block 52. In some known variations, the reader is configured to acquire an image using a parameter group one time, or more than one time, or continuously.

Once an image has been stored to memory, a data processor selects the image from memory and executes a predetermined algorithm on the stored image data in an attempt to decode the image data, as indicated at process blocks 62 and 64. Typically, images are operated on in the same sequence as they are acquired and stored in memory, although some images may be discarded, for example.

Optionally, the reader is configured to perform some image filtering operations on the image prior to decoding, as indicated at decision block 66. This image filtering is performed by the processor, as indicated at process block 68, or it is performed by hardware prior to storing the image to memory. Filtering can be considered part of the decode processing itself, but when considered as a separate pre-processing step, it is designed to transform the image in a manner such that further decode processing is easier, (e.g., such as a contrast enhancement to enhance the mark features, or image smoothing to suppress background texture).

After the decoding step of process block 64, if the mark is found and successfully decoded, as indicated at decision block 70, the reader typically will transmit the decoded data from the mark by outputting the decoded data, and/or actuating some form of user feedback such as a beeper and/or status lights, and turn the illumination OFF, as indicated at process block 72. The process is then repeated upon activation of the next trigger event. If the decoding step does not result in a decoded image, the process typically returns to process block 62 to select another image from memory for decoding.

A primary weakness for both fixed mount readers and handheld readers is the large variation in overall trigger-to-decode times when a variety of marks are present. In one configuration, known systems are configured to cycle through one or more image capture parameter groups during the image acquisition process. In a second known configuration, the system begins the image acquisition process with a parameter group that corresponds to the last successful decode.

Both of these methods are not ideal when there are variations in the mark properties. For example, the first configuration may provide a more consistent decode time for similar mark types, however some marks will have a significantly longer decode than other types depending on the sequence of the previously determined parameter group. The second configuration optimizes for the last decoded mark type, but any variation of the marks attempted to be imaged and decoded will introduce inconsistent and longer decode times.

It is recognized that certain aspects of the mark to be read can make it difficult to detect or decode it within a limited number of images. In particular, certain codes that have low contrast (e.g., printing on a brown cardboard box) may require the imaging system to perform adjustments to system parameter settings, such as gain or exposure, during the acquisition process. In such cases, the initial image acquisition settings may be inadequate and there may be a delay until a final, more-sufficient parameter settings are adjusted.

A valued usability metric for mark readers is this trigger-to-decode response time, or the time between actuating a trigger to initiate the image decoding process and the reader returning a successful decode response.

BRIEF SUMMARY OF THE TECHNOLOGY

The present embodiments overcomes the disadvantages of the prior art by providing improved systems and methods for reducing the trigger-to-decode response time by prioritizing a plurality of images to be decoded based on feature attributes calculated from an image analysis. The feature attributes provide an indication of the likelihood of a successful decode. A reader then can attempt to decode the highest or a higher priority image(s) first and avoid decoding images that are less likely than other images to be successfully decoded. By prioritizing at least some of the images to identify at least one of the images likely to be decodable, the mean time to a successful decode is decreased for a wide range of applications, including variations in the mark, variations of lighting/illumination, and variations in the presentation of the mark, such as orientation and surface characteristics.

Accordingly, some embodiments include a method for decoding a mark. The method comprises a variety of steps including: acquiring a plurality of images using an image acquisition system; assigning a priority to at least one acquired image based on feature attributes determined for the at least one acquired image; arranging the prioritized at least one acquired image into a prioritized image list; attempting to decode the prioritized at least one acquired image using a first decode algorithm; and if the first decode algorithm is unsuccessful at decoding the prioritized at least one acquired image: a. returning the prioritized at least one acquired image to the prioritized image list; b. selecting another of the prioritized at least one acquired image from the prioritized image list; and c. attempting to decode the another of the prioritized at least one acquired image using a second decode algorithm.

Other embodiments include a method for decoding a mark. The method comprises a variety of steps including: a. acquiring an image using an image acquisition system; b. determining if a predefined threshold for a prioritized image list has been met; c. attempting to decode the acquired image using a first decode algorithm if the predefined threshold for the prioritized image list has not been met; d. assigning a priority to the acquired image based on feature attributes determined for the acquired image if the first decode algorithm is unsuccessful at decoding the acquired image; e. storing the acquired image in the prioritized image list based on the priority assigned to the acquired image; f. repeating steps a through e until the predefined threshold for the prioritized image list has been met; and g. attempting to decode an image from the prioritized image list using at least one of the first decode algorithm and a second decode algorithm.

Consistent with the above, some embodiments also comprise a mark reader. The mark reader can comprise an image acquisition system. The image acquisition system can be configured to acquire a plurality of images containing a mark. A rating process can use feature attributes of at least one acquired image to provide a priority for the at least one acquired image. A decode process can use a first decode algorithm that attempts to decode one or more of the plurality of images based on the priority of at least one of the acquired images, and if the decode process is unsuccessful using the first decode algorithm, the decode process attempts to decode another of the plurality of images using a second decode algorithm.

To the accomplishment of the foregoing and related ends, the technology, then, comprises the features hereinafter fully described. The following description and the annexed drawings set forth in detail certain illustrative aspects of the technology. However, these aspects are indicative of but a few of the various ways in which the principles of the technology can be employed. Other aspects, advantages and novel features of the technology will become apparent from the following detailed description of the technology when considered in conjunction with the drawings.

DETAILED DESCRIPTION OF THE TECHNOLOGY

Figure 2:
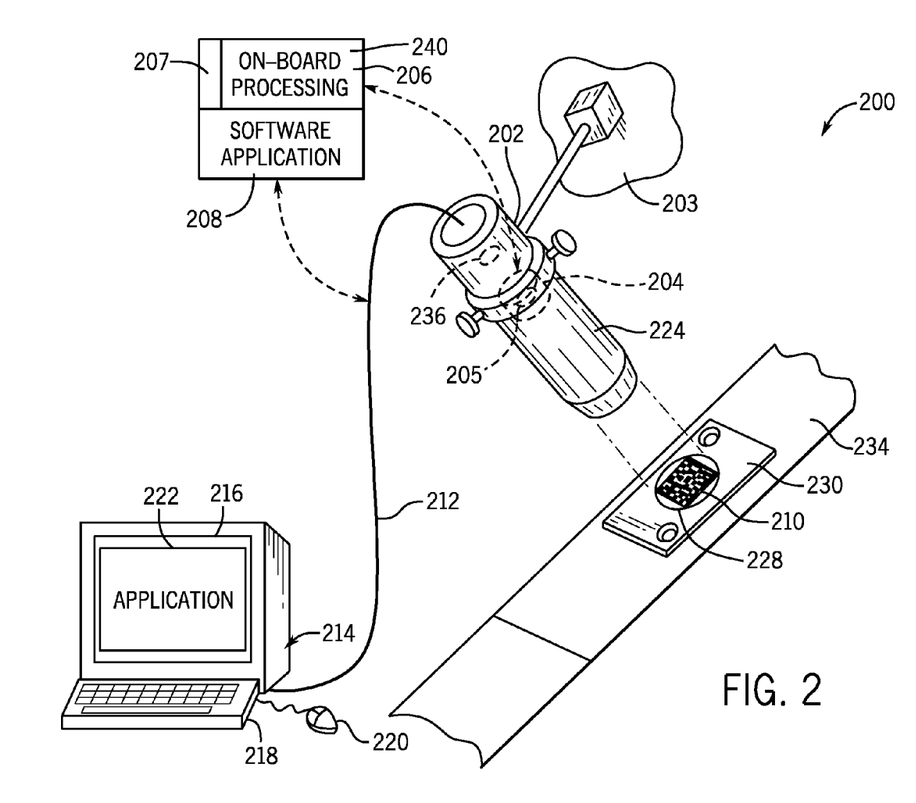
FIG. 2 is a perspective view of a fixed mount reader constructed in accordance with embodiments of the present technology.

Referring to the drawings wherein like reference numerals correspond to similar elements throughout the views, and more specifically, referring to FIG. 2, the present embodiments are described in the context of an exemplary fixed mount mark reader system 200. The exemplary reader is provided with camera element 202 that is a conventional camera mounted on a fixed bracket 203. The camera element includes an image acquisition system 204, including a sensor 205, both shown in phantom, and is controlled to direct image data to a remote or an onboard embedded processor 206. This processor includes a software application 208 by which illumination is controlled, images are acquired and image data is interpreted into usable information derived from the marks (such as the depicted two-dimensional mark 210). It is to be appreciated that a mark, as described herein, includes known and future developed symbologies, e.g., one dimensional, two dimensional, etc., using known and future developed marking methods, e.g., thermal printing, dot-printed, laser marked, chemical etch, dot-peened, etc. Usable information includes, for example, alphanumeric strings, binary data, and binary data along with interpretation information, such as a flag to indicate the binary data is Kanji character data. The decoded information is directed via a cable 212 or wireless link to a PC or other data storage and/or processing device 214 (e.g., computer, programmable logic controller) having, for example, a display 216, keyboard 218, and mouse 220, wherein some embodiments it is stored and further manipulated using an appropriate application 222. Other information such as decode success or decode failure may be transmitted by digital signaling on cable 212 or a different cable.

Alternatively, the cable 212 is directly connected to an interface (e.g., a USB port) in the camera element 202 and an appropriate interface in the computer 214, or the cable 212 is replaced with a wireless link. In this case, the computer-based application 222 performs various image interpretation/decoding and illumination control functions as needed. The precise arrangement of the fixed mount system with respect to embedded processors, computers or other processors is highly variable. For example, a wireless interconnect is provided in which no cable 116 is present. Likewise, in some embodiments, the depicted microcomputer is substituted with one or more processing devices, including an onboard processor or a miniaturized processing unit such as a personal digital assistant or other small-scale computing device.

The software application 208 is adapted to respond to inputs from the reader camera element. For example, when a trigger event occurs, such as an instruction from the application 222, illumination source 224 is turned ON, and the internal image sensor 205 (within the image acquisition system 204) acquires an image of a region of interest 228 on an object 230. In some of the embodiments herein, the illumination source is integrated with the camera's standard operating functions, such as strobe and trigger mechanisms, or it is controlled via the software application, for example. Separate control circuitry can also be provided to modulate certain functions of the illumination source.

As seen in FIG. 2, the camera element 202 is viewing parts or an object 230 moving along a conveyer 234. The exemplary region of interest 228 includes a two-dimensional mark 210 (as a non-limiting example) that is used to identify the object 230. Identification and other processing functions are carried out by the software application 208, based upon image data transmitted to the processor 206. An optional visual indicator 236 is illuminated by signals from the processor 206 to indicate a successful read and decode of the mark 210. In some embodiments, audible indicators (not shown) are also activated to indicate associated events.

In some embodiments described herein, the image sensor is a commercially available vision system on-chip (VSOC). A VSOC is a powerful, fully-programmable, autonomous vision system integrated on a chip, and is capable of acquiring and processing images at very high frame rates, and supporting decision-making based on the outcome from such image-processing. Other sensor types are also expressly contemplated, however. For example, in some embodiments the image sensor is a commercially available CMOS or CCD image sensor. Resolution ranges and other sensor types are expressly contemplated.

According to one aspect of the embodiments described herein, the exemplary reader system 200 is configured to reduce the trigger-to-decode time by prioritizing images to be decoded based on the likelihood of a successful decode, and thus decreasing the time to a successful decode. The systems and methods described herein are especially beneficial where the average time to attempt an image decode is greater than the average time to acquire, store, and analyze an image to extract feature attributes.

Figure 3:
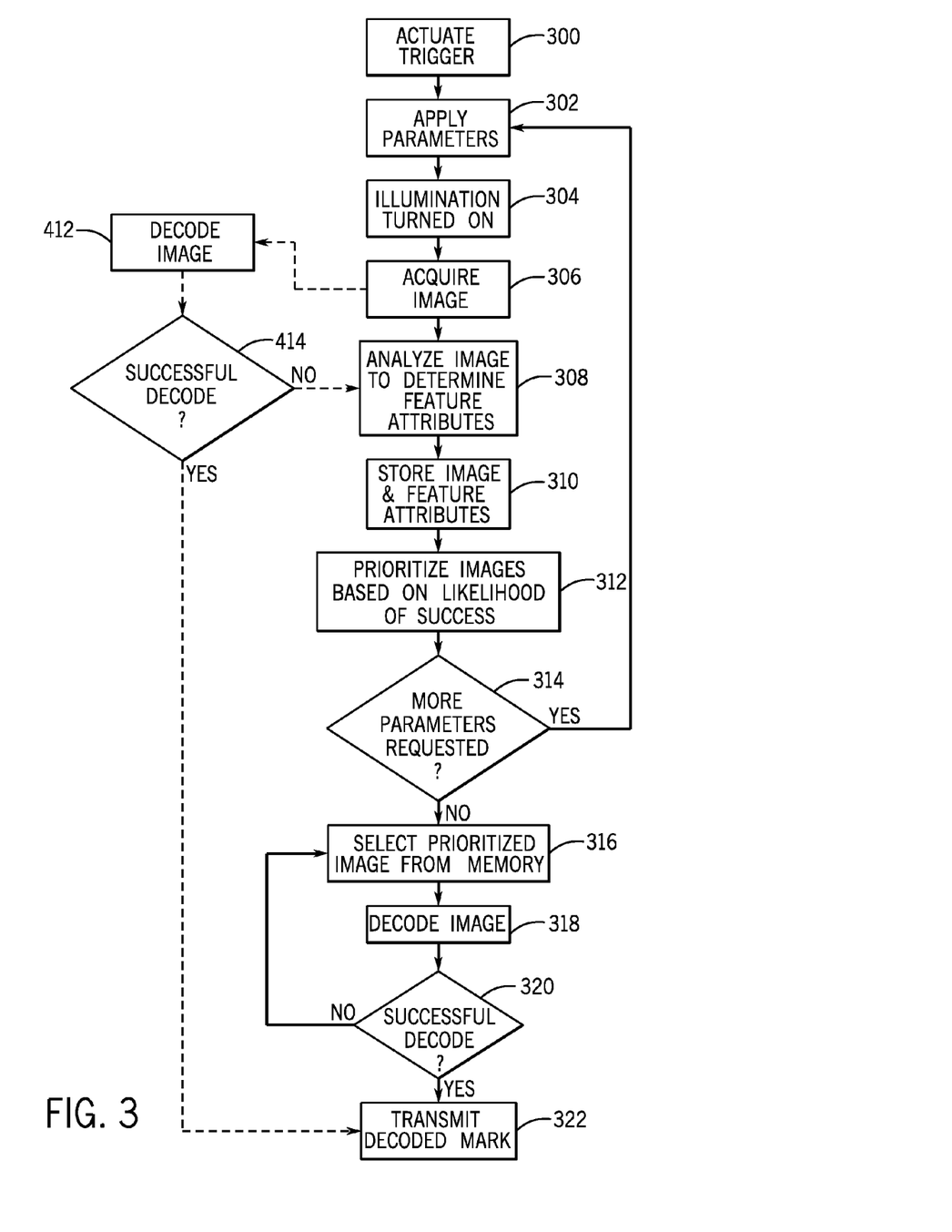
FIG. 3 is a flow chart illustrating an improved method whereby a reader constructed in accordance with embodiments of the present technology cycles through an image decoding process where images are prioritized.

Referring to FIG. 3, an exemplary method of the image decoding process operable with the system 200 is illustrated, with the systems and methods being configured to reduce the trigger-to-decode time. After the reader system 200 is initially turned ON, the image decoding process is initiated, such as by a trigger signal, as indicated at process block 300. The trigger signal is a state change on a digital input line or a communication signal sent to the reader across a communication link, such as an RS-232 or Ethernet link, as non-limiting examples. At this point, the reader may or may not be pointing at the mark to be decoded. The reader then applies the first in a selection of one or more parameter groups to the image acquisition system 204, as indicated at process block 302. Parameter groups include an arrangement of one or more parameters including exposure, gain, focus, illumination selection, illumination control, and filtering, including no filtering, as non-limiting examples. After the parameters are applied, the illumination source 224 on or within the reader is turned ON at process block 304 to illuminate the mark to be decoded. Illumination, either external or ambient illumination and/or illumination from the reader, reflects off of the intended mark and back to the reader and onto, i.e., to expose, the sensor 205 in the image acquisition system 204 within the reader to acquire an image of the mark, as indicated at process block 306.

Use of a dual processor architecture is well suited for this method. For example, use of a VSOC as described above for the image acquisition system 204, in addition to the processor describe above (e.g., processor 206), provides for improved trigger-to-decode performance. In some embodiments, the processor 206 is a digital signal processor (DSP). The VSOC architecture allows for full 1024 times 752 pixels, for example, to be transferred to the DSP 206 in about 9.2 ms, where known decoding methods can take between 50-500 ms, for example. Additionally, the VSOC architecture allows for some image processing that is done in parallel with image data transfer and DSP processing (e.g., image decoding) so the feature attribute analysis time impact is minimal. The VSOC is also capable of transferring to memory 207 one or more post-filtered images in addition to or in substitution of one or more pre-filtered images.

In one embodiment, when a VSOC is used for the image acquisition system, the VSOC 204 allows for the execution of a predetermined algorithm on the image to analyze the image to determine image feature attributes, as indicated at process block 308. Because of the processing capability of the VSOC, in some embodiments, this analysis takes place before the image (and feature attributes) are stored to memory, as indicated at process block 310. The feature attributes of the image provide an indication of the likelihood that the image will result in a successful decode. Feature attributes include contrast, sharpness, edge definition, size, shape, and orientation, as non-limiting examples. The image is then prioritized based on its feature attributes, and the prioritized image is arranged into a prioritized image list 152 (see FIG. 4), as indicated at process block 312.

Figure 5:
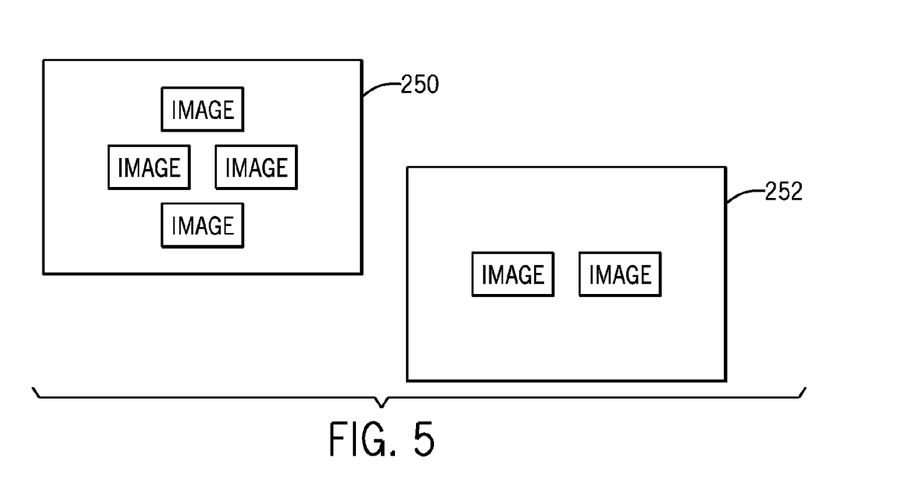

Other prioritization schemes are also contemplated, including not prioritizing all the acquired images. In some embodiments, the acquired images are not prioritized because of some other event, such as a timeout, a first image decode, or for optimization. In other embodiments, the images are prioritized into one or more groups, as compared to a prioritized list. For example, in one embodiment shown in FIG. 5, the acquired images are prioritized into a priority group 250 and a non-priority group 252, and one or more images would be selected from the priority group before one or more images are selected from the non-priority group. In addition, images from the non-priority group need not ever be selected. An image other than the highest priority image or from the priority group may also be chosen, depending on the application.

In an alternative embodiment, when a CMOS or CCD image sensor 205 is used, processor 206, or an additional processor 240, performs the analysis of the acquired image to determine image feature attributes. The software application for processor 206 need not be the same application running for processor 240. In this embodiment, once the image is acquired, as indicated at process block 306, the image is analyzed to determine feature attributes, as indicated at process block 308. The calculated feature attributes are then used to prioritize the image, as indicated at process block 312.

Figure 4:
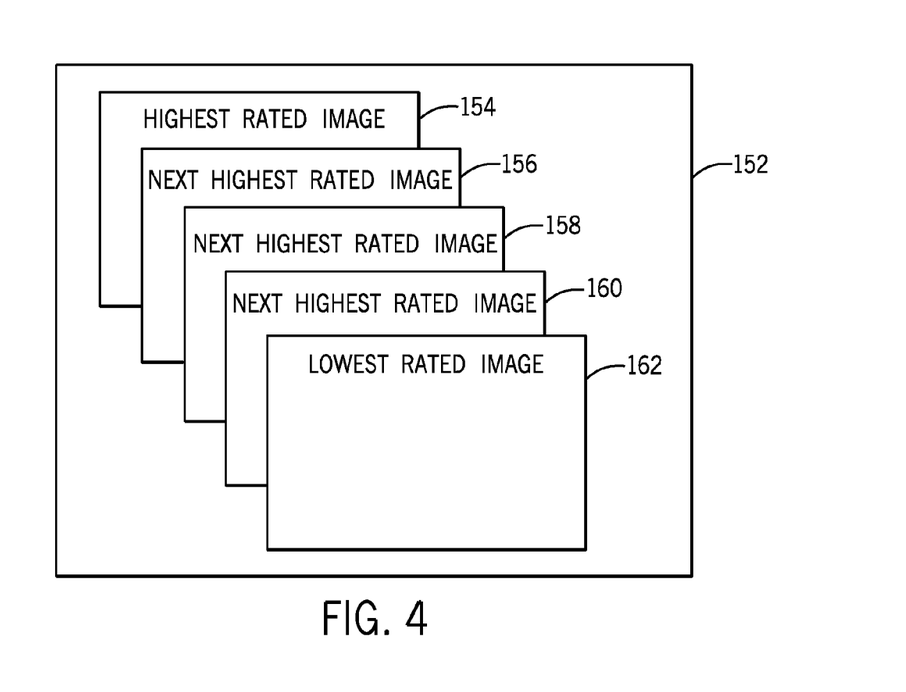
FIGS. 4 and 5 are representations of prioritized images usable with the embodiments of the technology.

If the reader is configured to acquire one or more additional images, a new parameter group is applied to the acquisition system and the process repeats at process block 302 to acquire, analyze, store and prioritize additional images for the prioritized image list 152. In some variations, the reader is configured to acquire an image using a parameter group one time, or more than one time, or continuously.

In some embodiments, one or more image feature attributes are used to produce a metric that provides an indication of the relative likelihood of a successful decode. The images are rated such that a higher priority image or the highest priority image is selected first for decoding. For example, the image with the highest relative likelihood of a successful decode is the highest rated image 154 on the list, and the image with the next highest relative likelihood is rated next highest 156 on the list, and so on, as indicated with images 158 and 160, until the image with the lowest relative likelihood of a successful decode is determined as the lowest rated image 158.

Once the first acquired image (and possibly feature attributes) has been stored to memory, the second processor 206, selects the first acquired image, or if not the first image, a higher priority image or the highest priority image, from the prioritized image list in memory and executes a predetermined algorithm on the stored image data in an attempt to decode the image data, as indicated at process blocks 316 and 318. As described above, a feature of the methods described herein allows the second processor 206 to attempt to decode the first image, or a higher priority image, in parallel with the VSOC 204 while the VSOC is acquiring, analyzing, storing, and prioritizing images for the second processor to use in attempts to decode.

For example, image 154 is selected from the prioritized image list 152 for decoding, as indicated at process block 316. This first image 154 is taken from the top of the prioritized image list, i.e., the image has the highest relative likelihood of a successful decode and is the highest rated image on the list 152. If the image data is acceptable, this highest rated image 154 is decoded or analyzed for the presence of a mark, as indicated at process block 318.

In some embodiments, as indicated at decision block 320, if the decoding step 318 does not result in a decoded image, the process moves back to process block 316 and selects another higher priority image, such as the next highest rated image 156 from the prioritized image list for decoding, i.e., the process selects the second image 156 from the list, the image having the second highest relative likelihood of a successful decode compared to the highest rated image 154. This process is repeated for as many images as there are on the prioritized image list 152, or for as many times as required to decode the image, or until the user releases the trigger, or until a timeout condition occurs, for example. As described above, in one embodiment, while processor 206 is selecting prioritized images from memory and attempting to decode, in parallel, the VSOC is acquiring, analyzing, storing, and prioritizing additional images in the prioritized image list 154 for the second processor to use in attempts to decode.

It is to be appreciated that "in parallel" may define a process that is truly in parallel if hardware supported, such as with multiple processors or a multi-core processor, or in parallel may define a process that is interleaved with another process, where only one processor is executing both processes.

In other embodiments, when highest rated image 154 is selected from the prioritized image list 152 for decoding, as indicated at process block 316, this highest rated image 154 can be first decoded or analyzed for the presence of a mark, as indicated at process block 318, using a simple algorithm, e.g., a less complex algorithm that can be executed faster than a more sophisticated algorithm, and that may provide less successful decodes than a more sophisticated algorithm. If the decoding step 318 does not result in a decoded image, the process can again decode or analyze the highest rated image 154 for the presence of a mark using a more sophisticated algorithm. Or, for example, another simple algorithm can be used that attempts to decode for the presence of a particular mark different that the first simple algorithm. Additional decoding options are possible, as would be understood by one skilled in the art.

Figure 10:
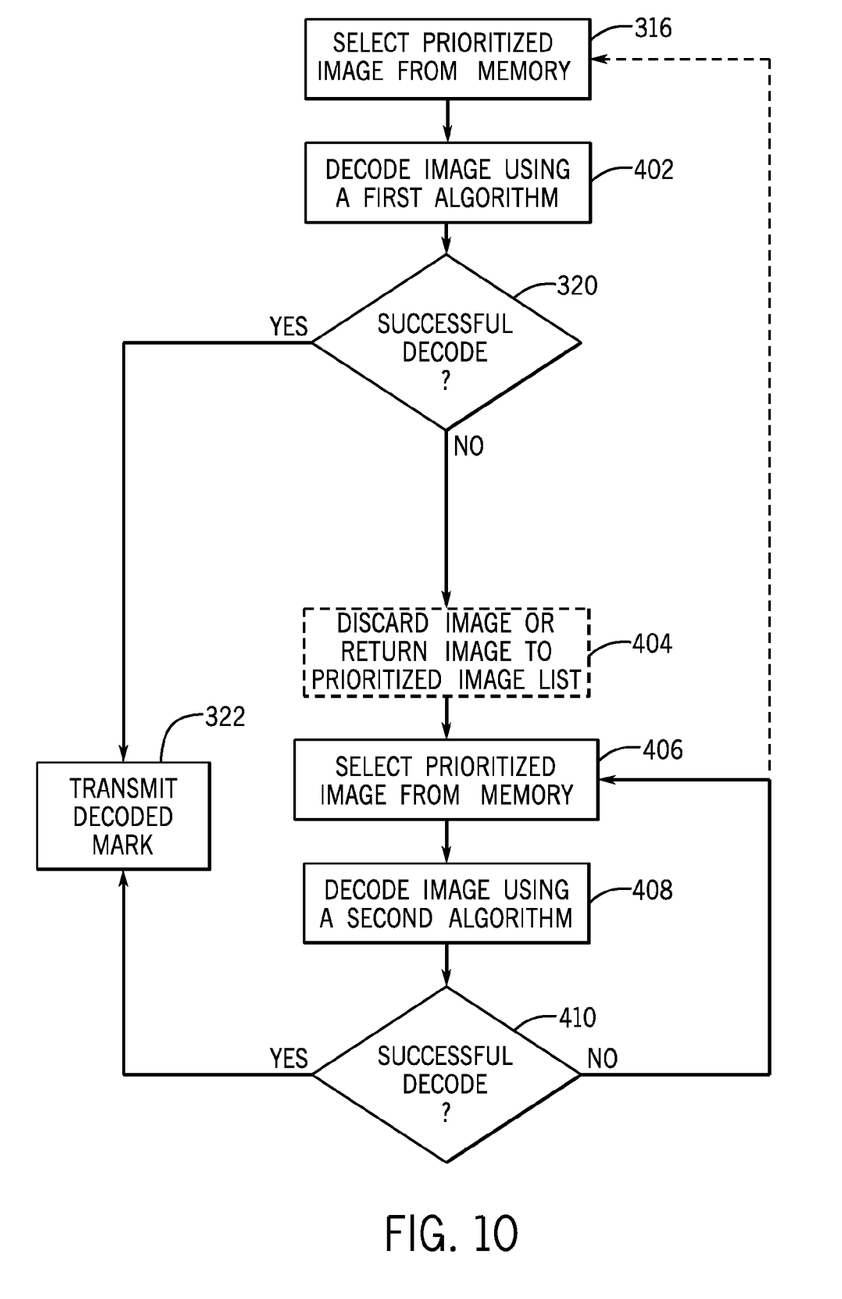
FIG. 10 is a flow chart illustrating an additional optional method usable with embodiments of the technology.

In other embodiments, when highest rated image 154 is selected from the prioritized image list 152 for decoding, as indicated at process block 316, this highest rated image 154 can be decoded or analyzed for the presence of a mark, as indicated at process block 318. If the decoding step 318 does not result in a decoded image, the process can utilize a different algorithm, as described above, or the image can be discarded or moved back to the prioritized image list 152 for possible later use for decoding. For example, as seen in FIG. 10, one or more images can be attempted to be decoded using a first algorithm, at process block 402. If unsuccessful, the one or more of the images can optionally be discarded or returned to the prioritized image list 152, at process block 404. A decision to discard or return an image to the prioritized image list 152 can be based on factors such as available memory and/or image analysis factors, as non-limiting examples. An example of an image analysis factor can be confidently identifying the presence of a mark, but not decoding the mark with the first algorithm. The image analysis factors can be independent of the first algorithm, or can be a part of the first algorithm. Then, the decoding process can switch to a second algorithm, and can again select the highest rated image 154 from the prioritized image list 152 at process block 406, or the next highest rated image 156 from the prioritized image list 152, and so on, for decoding at process block 408. At decision block 410, if the decoding step 408 does not result in a decoded image, the process can move back to process block 316 and select another prioritized image for decoding using the first algorithm, or optionally, the process can move back to process block 406 and select another prioritized image for decoding using the second algorithm. The highest rated image 154 on the prioritized image list 152 can be an image that was attempted to be decoded but failed, and was returned to the prioritized image list 152, or the highest rated image 154 on the prioritized image list 152 can be an image that has not yet been attempted to be decoded. The first algorithm and the second algorithm, or more than first and second algorithms, can be simple and more sophisticated algorithms, or can be algorithms focused on a particular mark type, or any combination.

When the mark is found and successfully decoded, the reader typically will transmit/indicate the decoded data from the mark by outputting the decoded data, and/or actuating some form of user feedback such as a beeper and/or status lights, and/or digital signaling, as indicated at process block 322. At this point, the reader 200 is configured to return to process block 300 to await the next trigger event.

In another embodiment, after the reader system 200 has been initially turned ON, there may be zero images stored in the prioritized image list 152 for selection by the second processor 206 for an attempted decode, as described above. Instead of executing a predetermined algorithm on the first acquired image to analyze the image to determine image feature attributes, as indicated at process block 308, or in parallel with executing the predetermined algorithm on the first acquired image to analyze the image to determine image feature attributes, and then storing the image in the prioritized image list 152 for selection by the second processor 206 for decoding, the first processor 204, or 240, and/or the second processor 206 can perform a simple decode algorithm, as indicated at process block 412, on the first image acquired, or on several of the first images acquired. In this embodiment, decoding can be attempted on the first image acquired, or several of the first images acquired, using a simple algorithm while the prioritized image list 152 is being developed. At decision block 414, if the decoding step 412 does not result in a decoded image, the process can continue with process block 308. It is to be appreciated that the prioritized image list 152 can include from one image to several thousand images, or more. Generally, the prioritized image list 152 can provide better results, i.e., a greater range of combinations of feature attributes for prioritization, when there are a greater number of prioritized images in the prioritized image list 152 as compared to a fewer number of prioritized images.

Some embodiments attempt to decode the first acquired image, or several of the first images acquired, until a predetermined number of images have been prioritized and stored in the prioritized image list 152. For example, the predetermined number of images stored in the prioritized image list 152 before the processor 206 looks to the prioritized image list to pick the highest rated image for processing could be five images, or fifty images, or five hundred images, as non-limiting examples. The predetermined number of images can be a user selectable variable, and can vary depending on specific applications.

Other embodiments can attempt to decode the first acquired image, or several of the first images acquired, using more than one simple algorithm, until the prioritized image list 152 is developed. For example, two simple algorithms could be used to attempt to decode the image. One algorithm could be a simple algorithm for a one-dimensional barcode, and the other algorithm could be for a two-dimensional algorithm, as non-limiting examples.

Other embodiments can attempt to decode the first acquired image, or several of the first images acquired, using a simple algorithm first, and if the simple algorithm is not successful, a more sophisticated algorithm can be used.

Yet other embodiments can attempt to decode the first acquired image, or several of the first images acquired, using the methods described above, while at the same time, the processor 206 can check on the development of the prioritized image list 152 to determine if some threshold has been met in order to begin using prioritized images from the prioritized image list 152. The threshold can be the number of images in the prioritized image list 152, as described above, or a high enough rating, e.g., over a predetermined minimum, assigned to at least one or more of the images in the prioritized list over, or an indication that one or more images contain image data for one or more mark types, as non-limiting examples.

Figure 6:
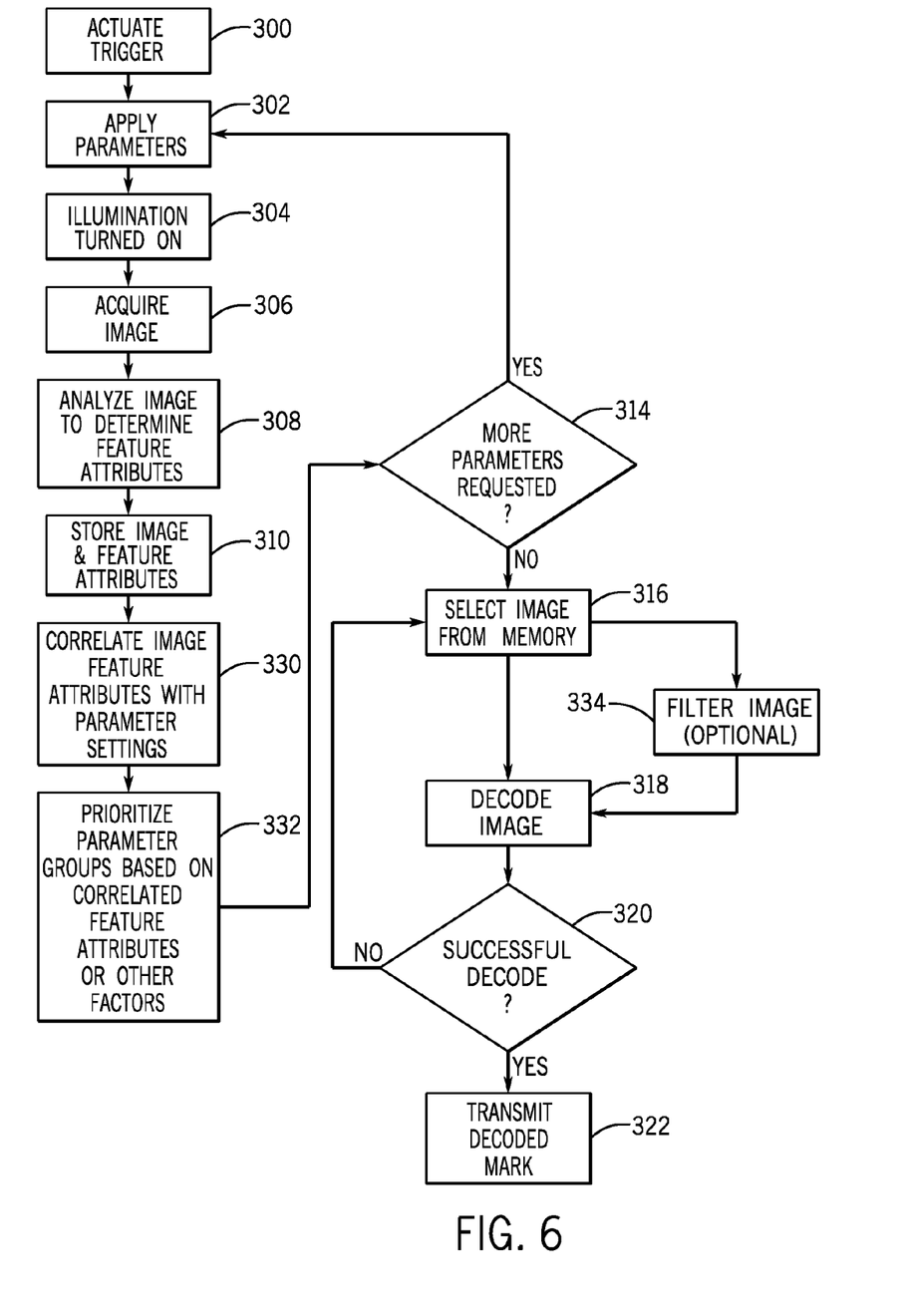
FIG. 6 is a flow chart illustrating an additional optional method usable with embodiments of the technology.

According to another aspect of the embodiments, not only are the feature attributes prioritized as shown in FIG. 3, but the feature attributes are also correlated with the parameter group used with each acquired image, as shown in FIG. 6. Similar to the systems and methods of FIG. 3, after the system 200 is initially turned ON, the image decoding process is initiated by a trigger signal, as indicated at process block 300. At this point, the reader may or may not be pointing at the mark to be decoded. The reader then applies the first in a selection of one or more parameter groups to the image acquisition system 204, as indicated at process block 302. After the parameters are applied, the illumination source 224 on or within the reader is turned ON at process block 304 to illuminate the mark to be decoded. Illumination, either external or ambient illumination and/or illumination from the reader, reflects off of the intended mark and back to the reader and onto, i.e., to expose, the VSOC when used as the image acquisition system 204, to acquire an image of the mark as indicated at process block 306.

Once the images are acquired as indicated at process block 306, VSOC 204 allows for the execution of an algorithm on the image to analyze the image to determine image feature attributes, as indicated at process block 308. As previously described, the processing capability of the VSOC allows this analysis to place before the image (and feature attributes) are stored to memory, as indicated at process block 310.

The feature attributes of the image provide an indication of the likelihood that the image will result in a successful decode. In an illustrative embodiment, the feature attributes of some or all of the images are correlated with parts of all of the parameter group used for the image, as indicated at process block 330. Based on the correlation, or other factors as described below, the parameter group is also prioritized in a parameter group list 170 (see FIG. 7), as indicated at process block 332. The parameter group that was used with an image and produced the highest relative likelihood of a successful decode based on the determined feature attributes is the highest rated parameter group 172 on the list, and the parameter group used with the image with the next highest relative likelihood of a successful decode is rated the next highest parameter group 174 on the list, and so on, as indicated with parameter groups 176 and 178, until the parameter group used with the image with the lowest relative likelihood of a successful decode is rated the lowest parameter group 180. The parameter groups in the prioritized parameter group list 170 is then used to determine the parameter group for subsequent image acquisition. A parameter group other than the highest parameter group can be chosen, depending on the application.

Figure 8:
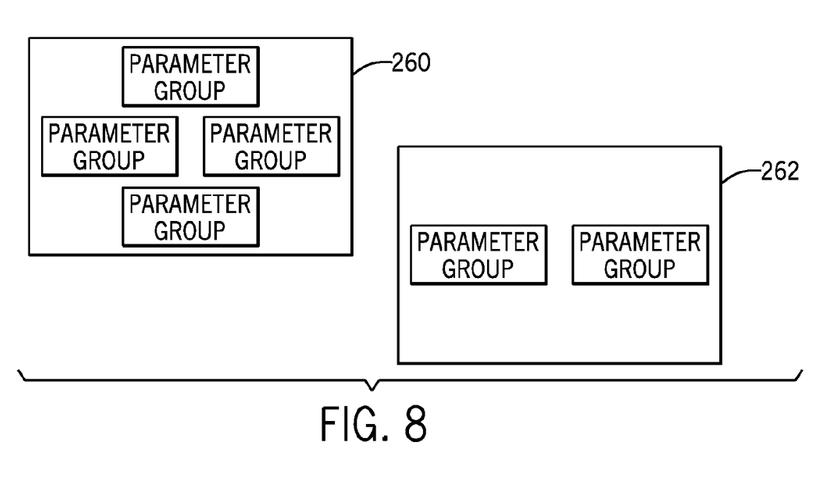

In other embodiments, the parameter groups are prioritized into one or more groups, as compared to a prioritized parameter group list. For example, in one embodiment shown in FIG. 8, the parameter groups are prioritized into a priority parameter grouping 260 and a non-priority parameter grouping 262, and one or more parameter groups would be selected from the priority parameter grouping before one or more parameter groups are selected from the non-priority parameter grouping. In addition, parameter groups from the non-priority parameter grouping need not ever be selected. A parameter group other than the highest priority parameter group or from the priority parameter grouping may also be chosen, depending on the application.

Figure 7:
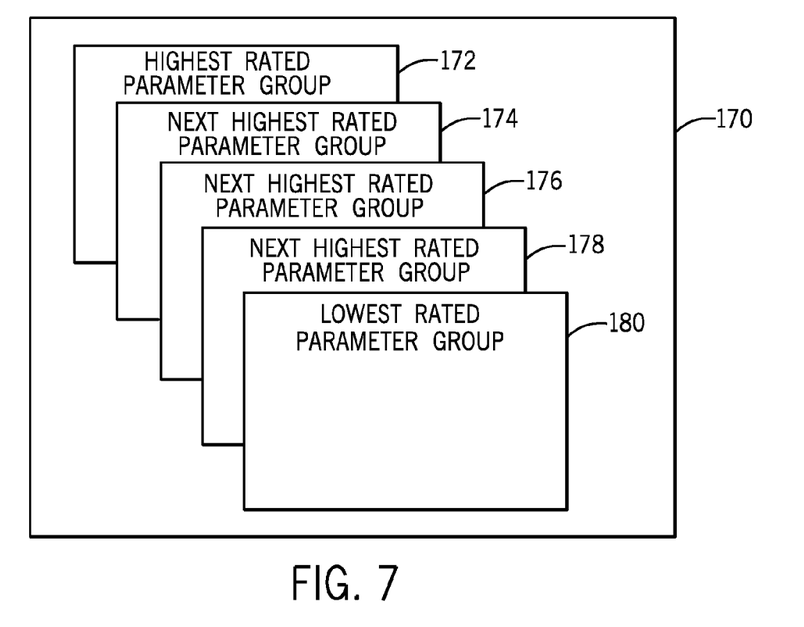
FIGS. 7 and 8 are representations of prioritized parameter groups usable with the embodiments of the technology.

If the reader is configured to acquire one or more additional images, a new parameter group is applied to the acquisition system and the process repeats at process block 302 to acquire, analyze, and store additional images. In one embodiment, the process moves to process block 302 to acquire the next image using the parameter group from the prioritized parameter group list 170. The parameter group is taken from the prioritized parameter group list, e.g., the parameter settings that produced the highest relative likelihood of a successful decode is placed on the top of the list, i.e., the highest rated parameter setting 172, and is used for acquiring the next image or images. It is to be appreciated that in some embodiments the parameter group is changed on a frame-by-frame basis using a parameter group from the parameter group list, or for example, a parameter group is used for each image acquired in a sequence of images. In some variations, the reader is configured to acquire an image using a parameter group one time, or more than one time, or continuously.

Once the first available image (and possibly feature attributes) has been stored to memory, the second processor 206, selects the first available image, or if not the first available image, another available image, for example, from memory and executes a predetermined algorithm on the stored image data in an attempt to decode the image data, as indicated at process blocks 316 and 318. As described above, a feature of the methods described herein allows the second processor 206 to attempt to decode the first image, or if not the first image, the next or another available image, in parallel with the VSOC 204 while the VSOC is acquiring, analyzing, and storing images for the second processor to use in attempts to decode.

Next, as indicated at decision block 320, if the decoding step does not result in a decoded image, the process moves back to process block 316 and selects the next available or another available image from memory 207 for decoding. This process is repeated for as many images as there are in memory, or for as many times as required to decode the image, or until the user releases the trigger, or until a timeout condition occurs, for example.

When the mark is found and successfully decoded, the reader typically will transmit/indicate the decoded data from the mark by outputting the decoded data, and/or actuating some form of user feedback such as a beeper and/or status lights, as indicated at process block 322. At this point, the reader 200 is configured to return to process block 300 to await the next trigger event.

Figure 9:
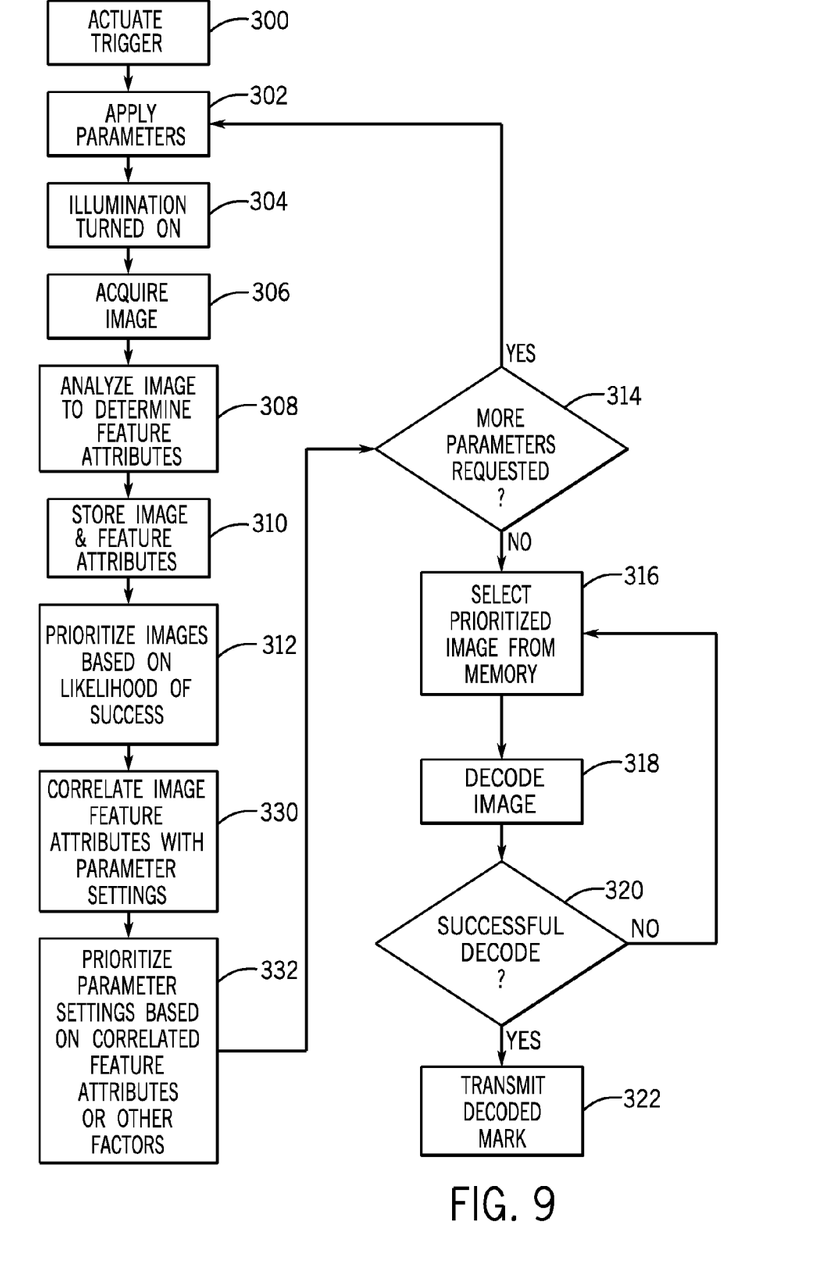
FIG. 9 is a flow chart illustrating an additional optional method usable with embodiments of the technology.

According to another aspect of the embodiments, the features of the systems and methods described in FIG. 3 are combined in whole or in part with the features of the systems and methods described in FIG. 6. In this way, not only are the images prioritized based on the feature attributes that may lead to a likelihood of a successful decode, the feature attributes identified in one or more image are further correlated with the parameter group used with the image to prioritize the parameter group for use in future image acquisitions, as shown in FIG. 9. Similar to the systems and methods of FIGS. 3 and 6, after the system 200 is initially turned ON, the image decoding process is initiated by a trigger signal, as indicated at process block 300. At this point, the reader may or may not be pointing at the mark to be decoded. The reader then applies the first in a selection of one or more parameter groups to the image acquisition system 204, as indicated at process block 302. After the parameters are applied, the illumination source 224 on or within the reader is turned ON at process block 304 to illuminate the mark to be decoded. Illumination, either external or ambient illumination and/or illumination from the reader, reflects off of the intended mark and back to the reader and onto, i.e., to expose, the VSOC when used as the image acquisition system 204, to acquire an image of the mark as indicated at process block 306.

Once the image is acquired as indicated at process block 306, the VSOC 204 executes a predetermined algorithm on the image data to analyze the image to determine image feature attributes, as indicated at process block 308. As previously described, the processing capability of the VSOC allows this analysis to place before the image (and feature attributes) are stored to memory, as indicated at process block 310. The feature attributes of the image provide an indication of the likelihood that the image will result in a successful decode. Feature attributes include contrast, sharpness, edge definition, size, shape, and orientation, as non-limiting examples. As indicated at process block 312, the image is then prioritized based on its feature attributes, and the prioritized image is arranged into a prioritized image list 152 (see FIG. 4).

In an alternative embodiment, when a CMOS or CCD image sensor 205 is used, a processor in addition to processor 206 is included to perform the analysis of the acquired image to determine image feature attributes. In this embodiment, once the image is acquired, as indicated at process block 306, the image is first stored in memory prior to analyzing the image to determine feature attributes. Once stored, the additional processor then analyzes the image to determine feature attributes, and then stores to memory the calculated feature attributes associated with the image.

The image feature attributes are combined into a metric that provides an indication of the relative likelihood of a successful decode. It is also contemplated that only one feature attribute influences the metric. The images are rated such that a higher priority image or the highest priority image is selected first for decoding. For example, the image with the highest relative likelihood of a successful decode is the highest rated image 154 on the list, and the image with the next highest relative likelihood is rated next highest 156 on the list, and so on, as indicated with images 158 and 160, until the image with the lowest relative likelihood of a successful decode is determined as the lowest rated image 158.

In some embodiments, the feature attributes of each individual image are then correlated with the parameter group used for the image, as indicated at process block 330. Based on the correlation, or other factors as described below, the parameter group is also prioritized in a prioritized parameter group list 170 (see FIG. 7), as indicated at process block 332. The parameter group that was used with an image and produced the highest relative likelihood of a successful decode based on the determined feature attributes is the highest rated parameter group 172 on the list, and the parameter group used with the image with the next highest relative likelihood of a successful decode is rated the next highest parameter group 174 on the list, and so on, as indicated with parameter groups 176 and 178, until the parameter group used with the image with the lowest relative likelihood of a successful decode is rated the lowest parameter group 180. The parameter groups in the prioritized parameter group list 170 can then be used to determine a parameter group for subsequent image acquisition. If the reader is configured to acquire one or more additional images, a new parameter group is applied to the acquisition system and the process repeats at process block 302 to acquire, analyze, and store additional images. In one embodiment, the process moves to process block 302 to acquire the next image using the parameter group from the prioritized parameter group list 170. A prioritized parameter group is taken from the prioritized parameter group list, e.g., a higher priority parameter group or the highest priority parameter group is used. It is to be appreciated that in some embodiments the parameter group is changed on a frame-by-frame basis using a parameter group from the parameter group list, or for example, a parameter group is used for each image acquired in a sequence of images. In some variations, the reader is configured to acquire an image using a parameter group one time, or more than one time, or continuously.

Figure 11:
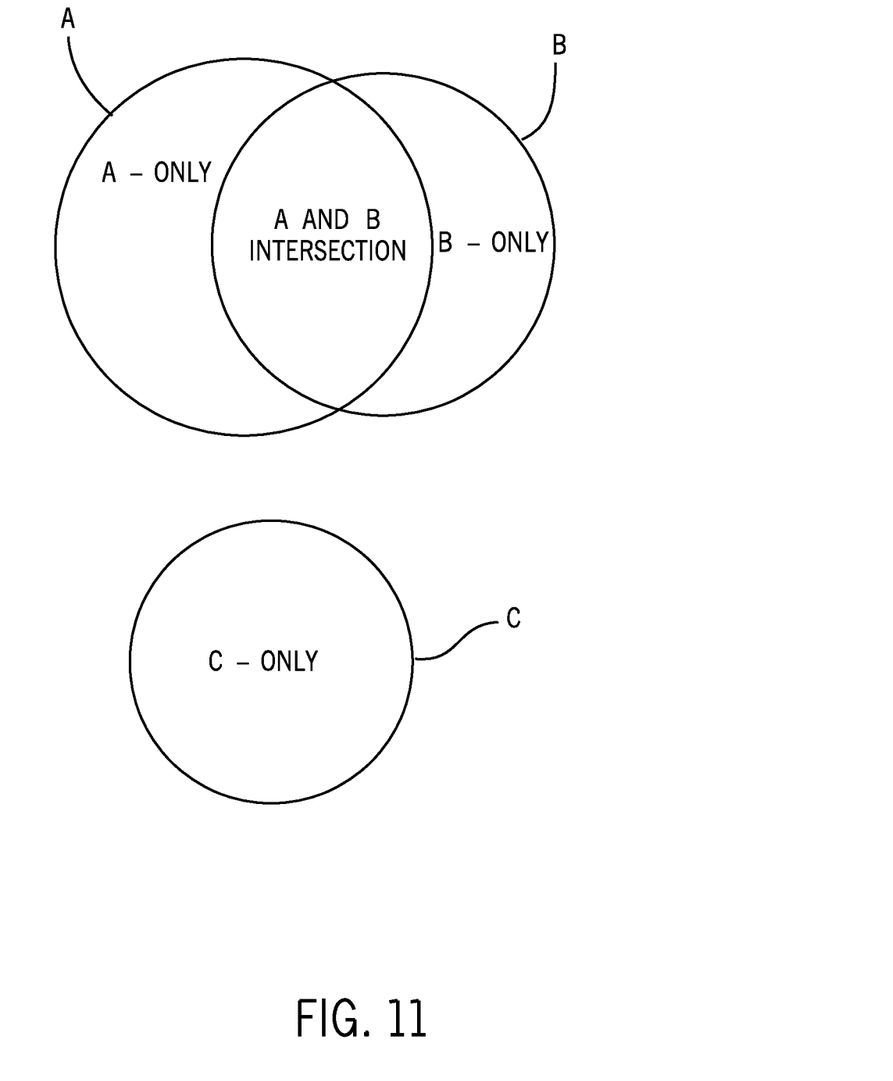
FIG. 11 is a diagram showing a relationship between several parameter groups that can be prioritized based on resulting in a successful decode.

A parameter group can also be prioritized based on other factors. Referring to FIG. 11, other factors that can be considered for prioritizing parameter groups can be a calculated or measured probability and/or a frequency of parts having a mark that is being imaged, and the particular parameter group being used that will result in a successful decode. As a non-limiting example, there are three representative parameter groups, group A, group B, and group C. For a set of sample parts and an associated reader orientation, parameter group A can decode a larger set of parts/marks than parameter group B and parameter group C, and parameter group B can decode a larger set of parts/marks than parameter group C. For the set of sample parts, parameter group A and parameter group B can overlap significantly, i.e., both parameter group A and parameter group B are able to decode many of the same parts/marks. This set of sample parts/marks can be categorized as being decoded by "A-only", "B-only" or "A and B intersection".

In this example, the number of parts/marks corresponding to being decoded by "A-only" is greater than the number of parts/marks being decoded by "B-only," and the number of parts/marks being decoded by "A and B intersection" is greater than either of "A-only" and "B-only." Parameter group C does not decode the same parts/marks as either parameter group A or parameter group B, and decodes "C-only" parts/marks. For this example, the number of parts/marks corresponding to being decoded by "C-only" is greater than the number of sample parts/marks being decoded by both "A-only" and "B-only", and could be less than or greater than the number of parts/marks being decoded by "A and B intersection". So, in this example, parameter group A could be prioritized higher than both parameter group B and parameter group C because the number of parts/marks decoded by parameter group A ("A-only" plus "A and B intersection") is greater than the number of parts/marks decoded by either parameter group B ("B-only" plus "A and B intersection") or parameter group C ("C-only"). Parameter group C could be prioritized higher than parameter group B because the number of sample parts/marks decoded by parameter group C ("C-only") is greater than the remaining portion of parameter group B ("B-only") not covered by parameter group A. Although parameter group B is larger than parameter group C, the higher priority parameter group A includes "A-only" and "A and B intersection" parts/marks, and parameter group C, which is the same as "C-only," is larger than the remaining "B-only" parts/marks.

Depending on a particular application, prioritization can also take into account the likelihood of occurrence of these sample parts/marks. For example if "B-only" parts/marks occurred much more frequently than "A-only" parts/marks, then parameter group B may be prioritized higher than parameter group A.

Further, based on the frequency with which specific parameter groups result in successful decoding, with successful decoding being based on frequency of attempts to image a part/marks, a likelihood of success with each part/marks, orientation of the part/mark, etc., each parameter group can also be weighted differently to determine a priority.

As would be known to one skilled in the art, some parameters are slower, or faster, to change than other parameters. For example, the focus parameter can pose a longer delay to effect a change in focus as compared to a change in the illumination parameter. Data associated with the timing of implementation of one or more parameters can be used to produce a metric that provides a rating factor for prioritization. As a non-limiting example, a parameter group that includes more parameters that are faster to change can be prioritized higher in the prioritized parameter group list 170 than a parameter group that includes more parameters that are slower to change.

It is to be appreciated that a parameter group can be prioritized in the prioritized parameter group list 170 based on the correlation with the feature attributes alone, or in combination with these other factors.

Once the first image (and possibly feature attributes) has been stored to memory, the second processor 206, selects the first acquired image, or if not the first image, a higher priority image or the highest priority image, from the prioritized image list in memory and executes a predetermined algorithm on the stored image data in an attempt to decode the image data, as indicated at process blocks 316 and 318. As described above, a feature of the methods described herein allows the second processor 206 to attempt to decode the first image, or if not the first image, a higher priority image or the highest priority image, in parallel with the VSOC 204 while the VSOC is acquiring, analyzing, storing, and prioritizing images for the second processor to use in attempts to decode.

For example, image 154 is selected from the prioritized image list 152 for decoding, as indicated at process block 316. This first image 154 is taken from the top of the prioritized image list, i.e., the image has the highest relative likelihood of a successful decode and is the highest rated image on the list 152. If the image data is acceptable, this highest rated image 154 is decoded or analyzed for the presence of a mark, as indicated at process block 318.

Next, as indicated at decision block 320, if the decoding step 318 does not result in a decoded image, the process moves back to process block 316 and selects another higher priority image, such as the next highest rated image 156 from the prioritized image list for decoding, i.e., the process selects the second image 156 from the list, the image having the second highest relative likelihood of a successful decode compared to the highest rated image 154. This process is repeated for as many images as there are on the prioritized image list 152, or for as many times as required to decode the image, or until the user releases the trigger, or until a timeout condition occurs, for example. As described above, while processor 206 is selecting prioritized images from memory and attempting to decode, in parallel, the VSOC is acquiring, analyzing, storing, and prioritizing additional images in the prioritized image list 154 for the second processor to use in attempts to decode.

When the mark is found and successfully decoded, the reader typically will transmit/indicate the decoded data from the mark by outputting the decoded data, and/or actuating some form of user feedback such as a beeper and/or status lights, as indicated at process block 322. At this point, the reader 200 is configured to return to process block 300 to await the next trigger event.

In various embodiments described herein, one of the parameter group settings applied at process block 302 is a focal setting for an adjustable component, such as a lens or a mirror in the optical path. In one or more embodiments, a variable lens element is used, known as a liquid lens. The liquid lens is an optical device that changes focus position based on an applied voltage to a fluid or gel bounded by a flexible polymer, which changes the shape of the lens. Lens response times are typically 20-50 ms. When combined with standard lenses, the liquid lens can focus from device contact to infinity.

Other focal configurations are contemplated as well. For example, a lens or lenses is incorporated where movement of the lens or lenses is accomplished using small motors and/or voice coils and/or piezoelectric systems. In some embodiments, other variable lens elements are also used, for example, by changing the refractive index of a transparent material.

In various embodiments as described herein, it should be understood that the type of data that is read and captured by the image sensor 132 is not limited to bar codes or other such symbols. In the various embodiments described herein, unless otherwise specified, any type of symbols, characters, or pictures (e.g., driver's license photos), or other data may be captured by the image acquisition system 204. In addition, in some embodiments, the image acquisition system 204 comprises a smart sensor, such as vision system on a chip (VSOC), that is capable of providing raw or filtered data, along with image feature data, to a secondary processor, such as processor 206. Where such data is amenable to decoding, the processor 206 of the reader 200 decodes it; alternatively, the data is passed along for processing by an inspection system, an optical character recognition system, a host system, or stored locally or remotely for later read-out.

In additional various embodiments, the reader 200 is configured to perform image filtering operations on the image prior to decoding, as indicated at process block 334 in FIG. 6, for example. This image filtering is performed by the processor 206, or it is performed by hardware (e.g., the VSOC 204) prior to storing the image to memory. Images are considered pre-filtered, including un-filtered, or post-filtered. Feature attributes calculated from one or more images may be used to prioritize pre-filtered images, post-filtered images, or a collection of both. In one embodiment, post-filtered images are prioritized for decoding based on feature attributes from one or more pre-filtered images, such that a post-filtered image need not be created. This configuration avoids processing time spent in filtering images.

It is to be appreciated that in some embodiments the filtering is considered part of the decode processing itself, but when considered as a separate pre-processing step, the filtering is designed to transform the image in a manner such that further decode processing is easier, (e.g., such as a contrast enhancement to enhance the mark features, or image smoothing to suppress background texture). The choice of filtering is typically predetermined, although in some embodiments it is part of the selected parameter group.

As previously described, in some embodiments, the VSOC is capable of performing some image processing operations and may transfer to memory one or more post-filtered images in addition to or in substitute of the pre-filtered image.

It should be noted that the various embodiments described herein, including rating images based on feature attributes, prioritizing images, correlating feature attributes with parameter groups, prioritizing parameter groups, image filtering, and the like, may each be used independently or in various combinations with one another, and are user selectable or non-selectable features. In addition, in some embodiments, prioritization of images and/or parameter groups is based on the most recent decode attempt, or the prioritization is based on a combined determination of more than just the last decode, such that the results of more than one decode attempt are used for prioritization, for example. It is also contemplated that an image is decoded with one parameter group and also additional image(s) are acquired using prioritized parameter group(s) and decoded. When the scene observed by the camera does not change substantially, this may result in more than one decode attempt of the same mark.

One or more specific embodiments of the present technology have been described above. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Finally, it is expressly contemplated that any of the processes or steps described herein may be combined, eliminated, or reordered. In other embodiments, instructions may reside in computer readable medium wherein those instructions are executed by a processor to perform one or more of processes or steps described herein. As such, it is expressly contemplated that any of the processes or steps described herein can be implemented as hardware, software, including program instructions executing on a computer, or a combination of hardware and software. Accordingly, this description is meant to be taken only by way of example, and not to otherwise limit the scope of this technology.

Thus, the technology is to cover all modifications, equivalents, and alternatives falling within the spirit and scope of the technology as defined by the following appended claims. As such, the following claims are made:

What is claimed is:

1. A method for decoding a mark, the method comprising:
acquiring a plurality of images using an image acquisition system;
assigning a priority to at least one acquired image based on feature attributes determined for the at least one acquired image;
arranging the prioritized at least one acquired image into a prioritized image list;
attempting to decode the prioritized at least one acquired image using a first decode algorithm; and
if the first decode algorithm is unsuccessful at decoding the prioritized at least one acquired image:
 a. returning the prioritized at least one acquired image to the prioritized image list;
 b. selecting another of the prioritized at least one acquired image from the prioritized image list; and
 c. attempting to decode the another of the prioritized at least one acquired image using a second decode algorithm.

2. The method according to claim 1, further including analyzing at least one acquired image to determine feature attributes of the at least one acquired image.

3. The method according to claim 2, wherein the feature attributes provide an indication of the likelihood that the at least one acquired image will result in a successful decode.

4. The method according to claim 1, further including if the second decode algorithm is unsuccessful at decoding the another of the prioritized at least one acquired image:
 d. returning the another of the prioritized at least one acquired image to the prioritized image list;
 e. selecting a further one of the prioritized at least one acquired image from the prioritized image list; and
 f. attempting to decode the further one of the prioritized at least one acquired image using at least one of the first decode algorithm and the second decode algorithm and a third decode algorithm.

5. The method according to claim 1, wherein the first decode algorithm is a less complex algorithm, and the second decode algorithm is a more complex algorithm, where the less complex algorithm executes faster than the more complex algorithm.

6. The method according to claim 1, wherein the another of the prioritized at least one acquired image is the same image as the prioritized at least one acquired image.

7. The method according to claim 1, wherein the first decode algorithm is for a first mark symbology, and the second decode algorithm is for a second mark symbology different than the first mark symbology.

8. The method according to claim 1, wherein the first decode algorithm is for a first marking method, and the second decode algorithm is for a second marking method different than the first marking method.

9. A method for decoding a mark, the method comprising:
 a. acquiring an image using an image acquisition system;
 b. determining if a predefined threshold for a prioritized image list has been met;
 c. attempting to decode the acquired image using a first decode algorithm if the predefined threshold for the prioritized image list has not been met;

d. assigning a priority to the acquired image based on feature attributes determined for the acquired image if the first decode algorithm is unsuccessful at decoding the acquired image;
e. storing the acquired image in the prioritized image list based on the priority assigned to the acquired image;
f. repeating steps a through e until the predefined threshold for the prioritized image list has been met; and
g. attempting to decode an image from the prioritized image list using at least one of the first decode algorithm and a second decode algorithm.

10. The method according to claim 9, further including returning the image to the prioritized image list if the at least one of the first decode algorithm and the second decode algorithm are unsuccessful at decoding the image from the prioritized image list.

11. The method according to claim 10, wherein the image from the prioritized image list is a highest priority image from the prioritized image list.

12. The method according to claim 9, further including transmitting the decoded data from the mark if at step c, attempting to decode the acquired image using the first decode algorithm was successful.

13. The method according to claim 9, wherein step c further includes attempting to decode the acquired image using a first decode algorithm and at least a second decode algorithm if the predefined threshold for the prioritized image list has not been met.

14. The method according to claim 13, wherein the first decode algorithm is a less complex algorithm, and the at least a second decode algorithm is a more complex algorithm, where the less complex algorithm executes faster than the more complex algorithm.

15. The method according to claim 13, wherein the first decode algorithm is for a first mark symbology, and the at least a second decode algorithm is for a second mark symbology different than the first mark symbology.

16. The method according to claim 13, wherein the first decode algorithm is for a first marking method, and the second decode algorithm is for a second marking method different than the first marking method.

17. The method according to claim 9, wherein the predefined threshold for the prioritized image list is a predefined rating assigned to at least one acquired image having been stored in the prioritized image list.

18. The method according to claim 9, wherein the predefined threshold for the prioritized image list is a predefined number of acquired images having been stored in the prioritized image list.

19. The method according to claim 17, wherein the predefined number of acquired images is user definable.

20. A mark reader comprising:
   an image acquisition system, the image acquisition system configured to acquire a plurality of images containing a mark;
   a rating process that uses feature attributes of at least one acquired image to provide a priority for the at least one acquired image; and
   a decode process using a first decode algorithm that attempts to decode one or more of the plurality of images based on the priority of at least one of the acquired images, and if the decode process is unsuccessful using the first decode algorithm, the decode process attempts to decode another of the plurality of images using a second decode algorithm.

21. The mark reader according to claim 20, further including a prioritized image list, the rating process using the priority for the at least one acquired image to prioritize the at least one acquired image in the prioritized image list, the decode process using the first decode algorithm to decode the one or more of the plurality of images from the prioritized image list, and if the decode process is unsuccessful using the first decode algorithm, the decode process returns the one or more of the plurality of images to the prioritized image list, and attempts to decode another of the plurality of images using a second decode algorithm.

22. The mark reader according to claim 20, wherein at least one parameter group used for the at least one acquired image is prioritized based on a measured probability of the mark being successfully decoded.

23. The mark reader according to claim 22, wherein subsequent images are acquired using prioritized parameter groups.

24. The mark reader according to claim 20, wherein at least one parameter group used for the at least one acquired image is prioritized based on the correlation of the at least one parameter group with the feature attributes of the at least one acquired image.

* * * * *